United States Patent
Cao et al.

(10) Patent No.: US 7,266,110 B1
(45) Date of Patent: Sep. 4, 2007

(54) APPARATUS AND METHOD FOR HYBRID TELECOMMUNICATIONS SWITCHING

(75) Inventors: Yang Cao, Bradford, MA (US); Antonio Zuniga, Houston, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 996 days.

(21) Appl. No.: 09/619,827

(22) Filed: Jul. 20, 2000

(51) Int. Cl.
  *H04L 12/66* (2006.01)
(52) U.S. Cl. ...................................... 370/352
(58) Field of Classification Search ................ 370/352, 370/354–355, 356, 907
  See application file for complete search history.

(56) References Cited

U.S. PATENT DOCUMENTS

| 5,390,184 | A | * | 2/1995 | Morris ........................ 370/353 |
| 5,537,403 | A | * | 7/1996 | Cloonan et al. ............ 370/352 |
| 6,134,238 | A | * | 10/2000 | Noh ....................... 370/395.51 |
| 6,317,439 | B1 | * | 11/2001 | Cardona et al. ............. 370/503 |
| 6,359,859 | B1 | * | 3/2002 | Brolin et al. ................ 370/218 |
| 6,798,779 | B1 | * | 9/2004 | Shimbashi et al. ....... 370/395.1 |

OTHER PUBLICATIONS

Raj jain, FDDI Handbook High-Speed Networking Using Fiber and Other Media☐☐Addison-Wesley Publishing Company☐☐p. 163.*

* cited by examiner

*Primary Examiner*—Chi Pham
*Assistant Examiner*—Anh-Vu Ly

(57) ABSTRACT

A hybrid telecommunications switch includes synchronous transfer mode (circuit), and packet switch fabrics. A controller within the hybrid switch determines the type of traffic that is to be switched in either switch fabric. Real time traffic, such as voice traffic, may be routed by the controller to an circuit switch fabric for example. Internet protocol (IP) and packet traffic may also be routed to the circuit switch fabric. A SONET/SDH overhead byte associated with traffic may be employed by the controller to determine which switch fabric to employ. Circuit switch resources are provisioned for circuit, IP and packet traffic. IP or packet traffic, as indicated by the path overhead byte, is routed to the packet switch after resources are dynamically allocated for the traffic.

9 Claims, 3 Drawing Sheets

APPARATUS AND METHOD FOR HYBRID TELECOMMUNICATIONS SWITCHING

FIELD OF THE INVENTION

The invention relates to telecommunications systems and, more particularly, to the efficient switching of both voice and data telecommunications traffic.

BACKGROUND OF THE INVENTION

In eighteen seventy-six, inside a third floor walk-up garret apartment in the Scollay Square section of Boston Mass., only a short distance from the sight of the first battle of the revolutionary war, Alexander Graham Bell spoke the first words transmitted over telephone wires. Bell's transmission of sound over telephone wires initiated a revolution in communications whose scope rivals that of the political revolution initiated by the sound, heard nearby, of "the shot heard round the world."

Technical innovations have dramatically transformed the telecommunications industry in the ensuing years. For example, telecommunications switching systems have evolved considerably from "hand operated" systems in which one instrument was electrically connected (through a hierarchical switching network) to another with the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS, e.g., 5ESS), in which the instruments are automatically connected through the network by electronic systems. Nevertheless, such switching systems often still employ circuit switching, a technique which yields highly reliable service, particularly for such "real time" communications applications as voice, in which the momentary loss of a channel is annoying, and repeated such losses are unacceptable.

Not only has switching technology undergone major changes, the type of traffic being carried on telephone lines has also changed dramatically. Although originally designed for voice traffic and "tuned" to operation in the voice band between approximately 350 and 4000 Hz, the telecommunications infrastructure also carries data, through the use of various channels, or tones. However, with the growing use of the Internet, and the potential development such high bandwidth applications such as interactive distance-learning and video on demand, the existing telecommunications infrastructure is in danger of being overwhelmed. A large portion of the system's transmission medium has been replaced with high speed trunks which employ fiber optic transmission media, microwave media, and line of sight optical media, for example, to meet the ever mounting demand for high speed data transmission capability. Data traffic is increasing at a rate of approximately 300% per year, while voice traffic is only increasing at the relatively slow rate of approximately 5% per year. However, a huge installed base of transmission media, switching devices, and other telecommunications infrastructure provide the telecommunications path for the vast majority of telecommunications providers and users.

A system and method that enable the efficient combination and management of circuit-switched and packet-switched facilities, thereby taking advantage of the tremendous installed base of equipment and facilities while, at the same time permitting an extensive upgrade of data facilities, which, typically employ packet switching systems would therefore be highly desirable.

RELATED APPLICATIONS

Patent applications entitled, "Apparatus and Method For Synchronous and Asynchronous Switching of Internet Protocol Traffic", and "Apparatus and Method For Synchronous and Asynchronous Switching of ATM Traffic", filed on the same day as this application and assigned to the same assignees as this application is assigned are hereby incorporated by reference.

SUMMARY

A telecommunications management system and method in accordance with the principles of the present invention includes facilities for managing telecommunications switching in a system that includes both circuit switching and packet switching facilities. The circuit switching facilities may use a Synchronous Transport Signal (STS) crossconnect with interfaces to SONET rings, for example, and the packet switching facility may switch IP packets and/or ATM cells. In one aspect of the invention, real-time traffic, such as voice traffic, may be separated from non-real-time traffic, such as Internet email traffic. Once separated, the real time traffic may be switched through a synchronous transfer mode (STM) switch fabric, which may also be referred to herein as a circuit-switched switch or time division multiplexed (TDM) switch fabric. The non-real-time traffic may be switched through a packet-switched switch fabric, such as an asynchronous transfer mode (ATM) switch fabric or an Internet Protocol (IP) switch fabric. For ease and clarity of description, packet switch fabrics, which may be either IP or ATM fabrics, will be referred to hereinafter as ATM switch fabrics.

In accordance with the principles of the present invention a hybrid switch includes packet and circuit switching switch fabrics, a hybrid switch manager and one or more input/output ports (I/O port). Telecommunications traffic enters the switch and, after the traffic is switched, departs to telecommunications network through the I/O port(s). In an illustrative embodiment, a SONET/SDH path layer overhead byte is employed to indicate to the hybrid switch manager which type of switch fabric, for example, STM or ATM, should be employed to switch the traffic associated with the SONET/SDH path layer overhead byte. This determination is made by the manager as the traffic arrives at the I/O port. Because the traffic load is shared, in parallel fashion, between the STM and ATM fabrics, neither switch need be of sufficient magnitude to accommodate the entire traffic load. In an illustrative embodiment the C2 byte within a SONET/SDH path overhead is used to indicate whether the associated traffic is to be routed to an STM, an IP and/or an ATM switch fabric.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
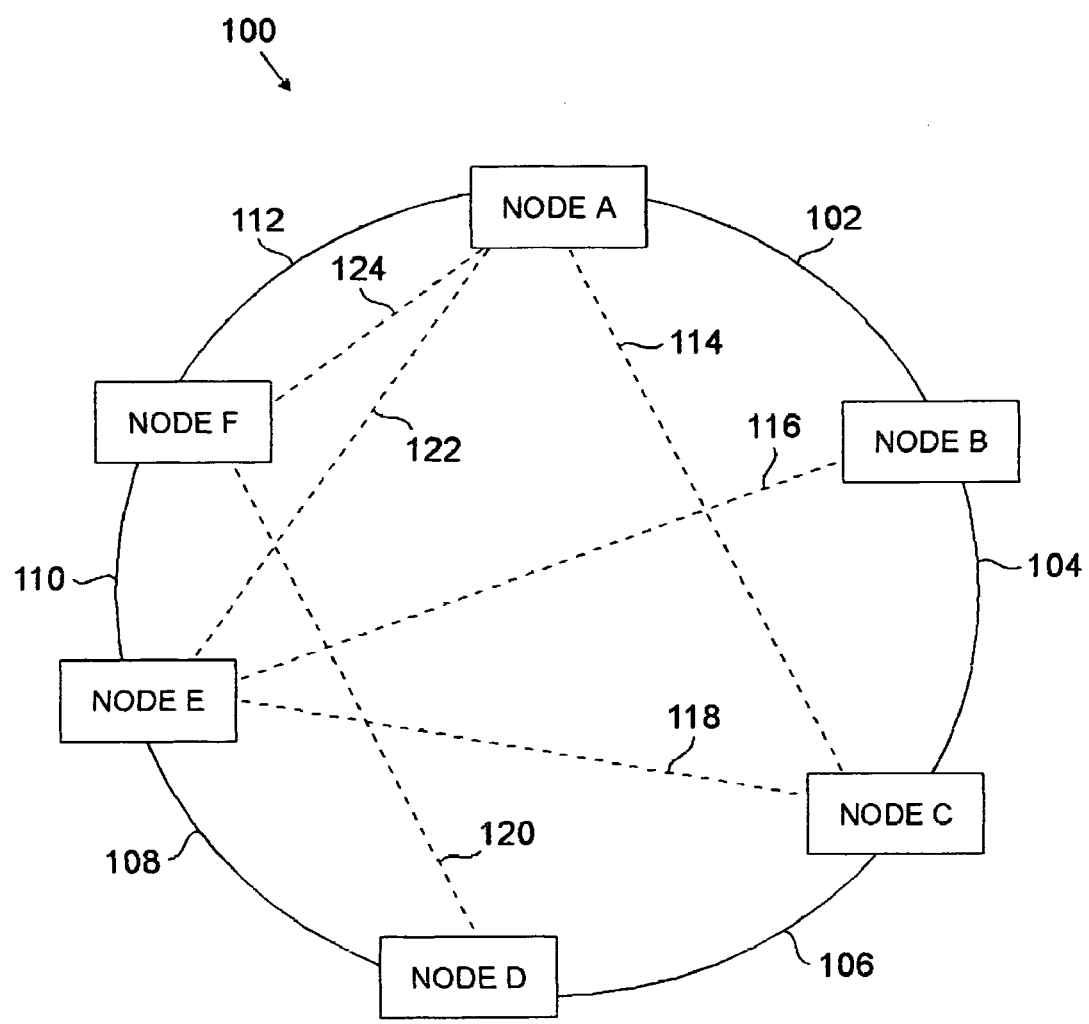
FIG. 1 is a conceptual block diagram which illustrates a network of hybrid switches in accordance with the principles of the present invention.

A hybrid telecommunications switch in accordance with the principles of the present invention includes both circuit switching and packet switching facilities and a management system and method for allocating traffic among the switching facilities. The circuit switching facilities may employ a Synchronous Transport Signal (STS) crossconnect with interfaces to SONET rings, for example, and the packet switching facility may use an ATM switch fabric for switching traffic in the form of ATM and/or IP packets or cells. In one aspect of the invention, traffic for which circuit switching may be more appropriate may be separated from traffic that is more suitably handled by packet switching facilities. That is, for example, real-time traffic, such as voice traffic, may be more appropriately handled by a circuit switching facility, and non-real-time traffic, such as Internet email traffic, may be more suitably handled by a packet switching facility. After separation, the real-time traffic may be switched through an STM switch fabric and the non-real time traffic, which may be ATM or IP traffic, may be switched through a packet switch fabric.

The new hybrid switches may be connected in any of a variety of network topologies. For ease and clarity of description, the illustrative embodiment of FIG. 1 includes six hybrid switches in accordance with the principles of the invention (Node A, Node B, Node C, Node D, Node E and Node F) that are connected in a ring 100, in which Nodes A and B are connected through a link 102, Nodes B and C are connected through a link 104, Nodes C and D are connected through a link 106, Nodes D and E are connected through a link 108, Nodes E and F are connected through a link 110, and Nodes F and A are connected through a link 112. As described in greater detail in the discussion related to FIGS. 2 and 3, each of the Hybrid switches (any of the nodes Node A through Node F) includes STM switch fabric facilities, ATM switch fabric facilities, Input/Output facilities and a switch manager that, in accordance with principles of the invention, examines incoming traffic and route the traffic to an appropriate switching facility within the hybrid switch. As previously noted, the invention may apply to other network topologies, such as meshes (wherein the nodes A through F may be connected through links 114, 116, 118, 120, 122, and 124, for example). Additionally, within the context of a ring topology, each of the nodes may be connected to a plurality of rings. The illustrative embodiment of FIG. 1 was chosen for clarity and simplicity of explanation. Furthermore, although the invention will be discussed in the context of employing a SONET/SDH physical link media, the invention may be used in conjunction with networks that employ other physical media.

Figure 2:
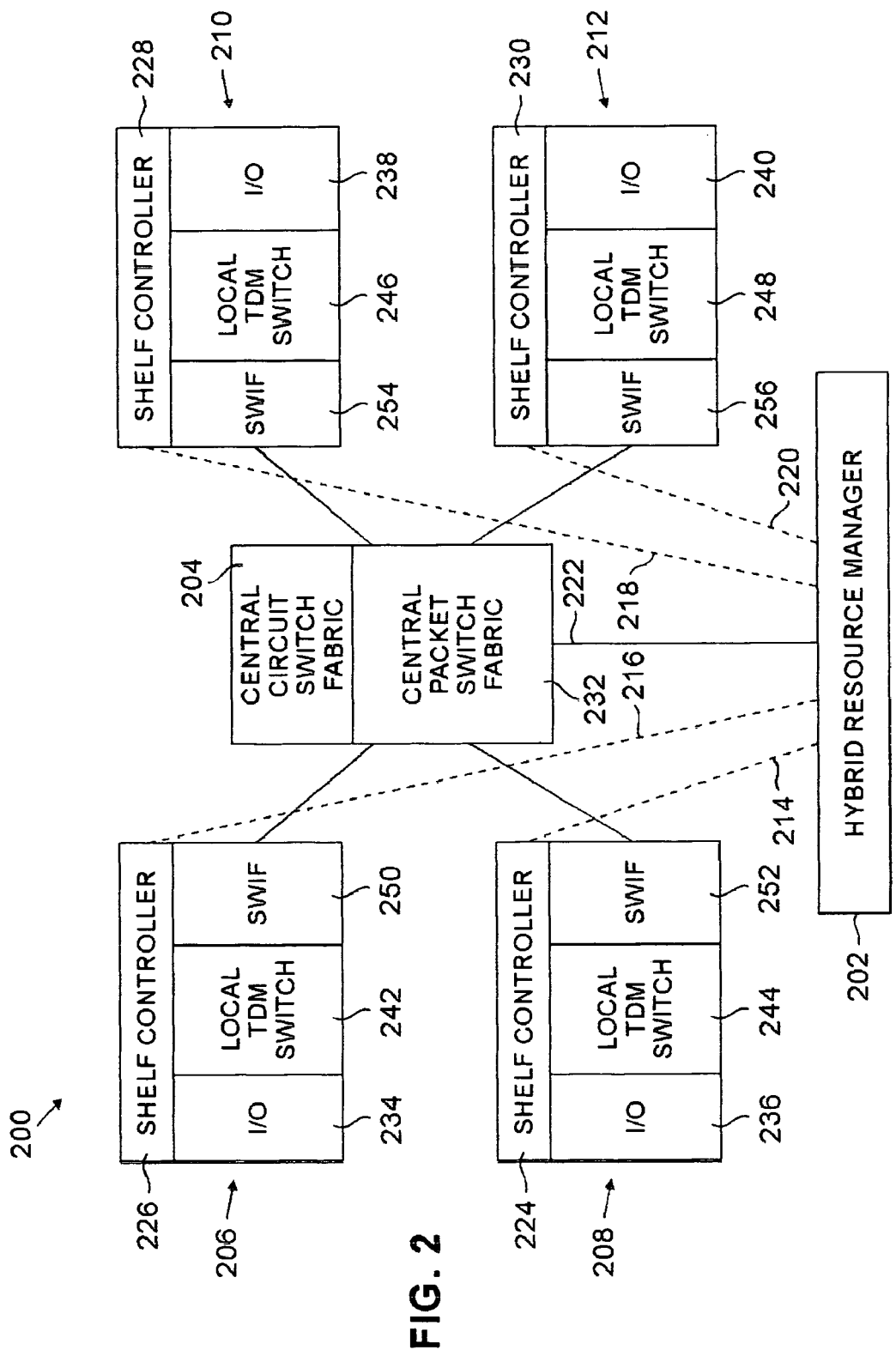
FIG. 2 is a conceptual block diagram of a hybrid telecommunications switch in accordance with the principles of the present invention.

Each of the Nodes A through F of FIG. 1 includes components such as illustrated in the conceptual block diagram of FIG. 2. The node 200 includes a hybrid resource manager 202, a central packet switch fabric 232, a central circuit switch fabric 204, and a plurality of STM units 206, 208, 210, and 212. The hybrid resource manager 202 operates to manage the switch resources through respective communications links 214, 216, 218, 220, and 222 to shelf controllers 224, 226, 228, 230, and a central packet switch fabric 232. The central packet switch fabric may be an Internet protocol (IP) switch fabric, an asynchronous transfer mode (ATM) switch fabric, or a combination of the two. The STM units 206, 208, 210 and 212 respectively include input/output (I/O) interfaces 234, 236, 238, and 240, local switch fabrics, 242, 244, 246, and 248, and switch interfaces, 250, 252, 254, and 256. An I/O interface, such as I/O interface 234 may provide a connection to another network element, or node, through a link such as the link 102 which connects nodes A and B of FIG. 1. Traffic arriving at one of the I/O interfaces is routed under control the hybrid resource manager 202 by a shelf controller which more directly controls the operation of a local STM switch. Each of the local STM switches may be, for example, an STS-1 level cross-connect, with the capacity of the cross-connect dependent upon the I/O capacity of the corresponding I/O interface. That traffic which is routed to the central packet switch fabric 232 may be directed through a switch interface, such as SWIF 250, embodied as an advanced "UTOPIA" interface which is capable of transferring both ATM cells and packet-based traffic.

As described in greater detail in the discussion related to FIG. 2, the hybrid resource manager partitions incoming traffic into STM and ATM streams. The STM portion may be switched in a local STM switch, such as local STM switch 242, for example, or it may be switched through a central STM switch fabric 204. Typically, a single ring SONET/SDH embodiment would require only one STM unit, such as the unit 206, to provide an interface to the ring and to provide the STM switching function. A multi-ring or mesh connection would include a plurality of the STM units, as illustrated, and the STM switching may be provided by a central STM switch fabric 204 which could direct traffic into and out of any of the I/O interfaces and to the packet switch fabric 232, as needed. Alternatively, traffic entering one STM unit could be packetized and switched through the central packet switch fabric 232 to travel between I/O interface 234 and I/O interface 240, for example. Each of the I/O interfaces, such as I/O 234, acts as a ring, or line interface. The hybrid resource manager 202 communicates with the next node in a path of which it is a part and determines, "on the fly", which switch fabric, such as a local STM 242, central packet 232, or central circuit 204 will be employed to switch traffic associated with a particular path overhead indicator.

For each inter-connecting link, such as link 102 between nodes A and B, the total bandwidth of the link is partitioned into a plurality of units and these units are allocated to STM, IP, and/or ATM traffic. If the packet switch fabric 232 supports a UTOPIA-II interface, the basic unit is an STS-1. If the switch fabric 232 supports a UTOPIA-III interface, the unit is an STS-3C. For example, if the link 102 is an OC192 link, and the switch fabric supports UTOPIA-III, the link is partitioned into 64 OC-3C based unit. For each unit, there is one entry in an ingress and egress resource table, as follows:

| Ingress Resource Table: | | | | |
|---|---|---|---|---|
| Tributary No. | Free Flag | Destination Address | Available Bandwidth | Status: Drop/Pass |

Egress Resource Table:

| Tributary No. | Free Flag | Destination Address | Available Bandwidth | Status: Add/Pass |
|---|---|---|---|---|

The destination Address is either based on the IP address for the node or a proprietary address. For each ingress link, there is one ingress resource table associated with it. Correspondingly, there is one egress resource table for each egress link. It is assumed that there is at least one entry in each link's resource table.

At initialization time, all the free flags are initialized to have the value 0, indicating that the link is free. The available Bandwidth interest takes the initial value of the link's total physical transmission bandwidth, the Destination Address is initialized as 0, and Status is initialized as either Add (egress link) or Drop (ingress link).

In accordance with the principles of the invention, a SONET/SDH path layer overhead byte is employed to indicate to a shelf controller such as shelf controller 226, which type of switch fabric, for example, STM or ATM, should be employed to switch the traffic associated with the SONET/SDH path layer overhead byte. This determination is made by the shelf controller, as instructed by the hybrid resource manager 202, as the traffic arrives at the I/O port. In an illustrative embodiment, the C2 byte within a SONET/SDH path overhead is used to indicate whether the associated traffic is to be routed to an STM, an IP and/or an ATM switch fabric. The C2 byte within a SONET/SDH path overhead indicates a synchronous payload envelope (SPE) construction type. For example:

C2=14(hex), SPE is carrying DQDB traffic

C2=15(hex), SPE is carrying FDDI traffic

C2=04(hex), SPE is carrying DS3 traffic

C2=13(hex), SPE is carrying ATM traffic

C2=cf (hex), SPE is carrying PPP (IP) traffic

Figure 3:
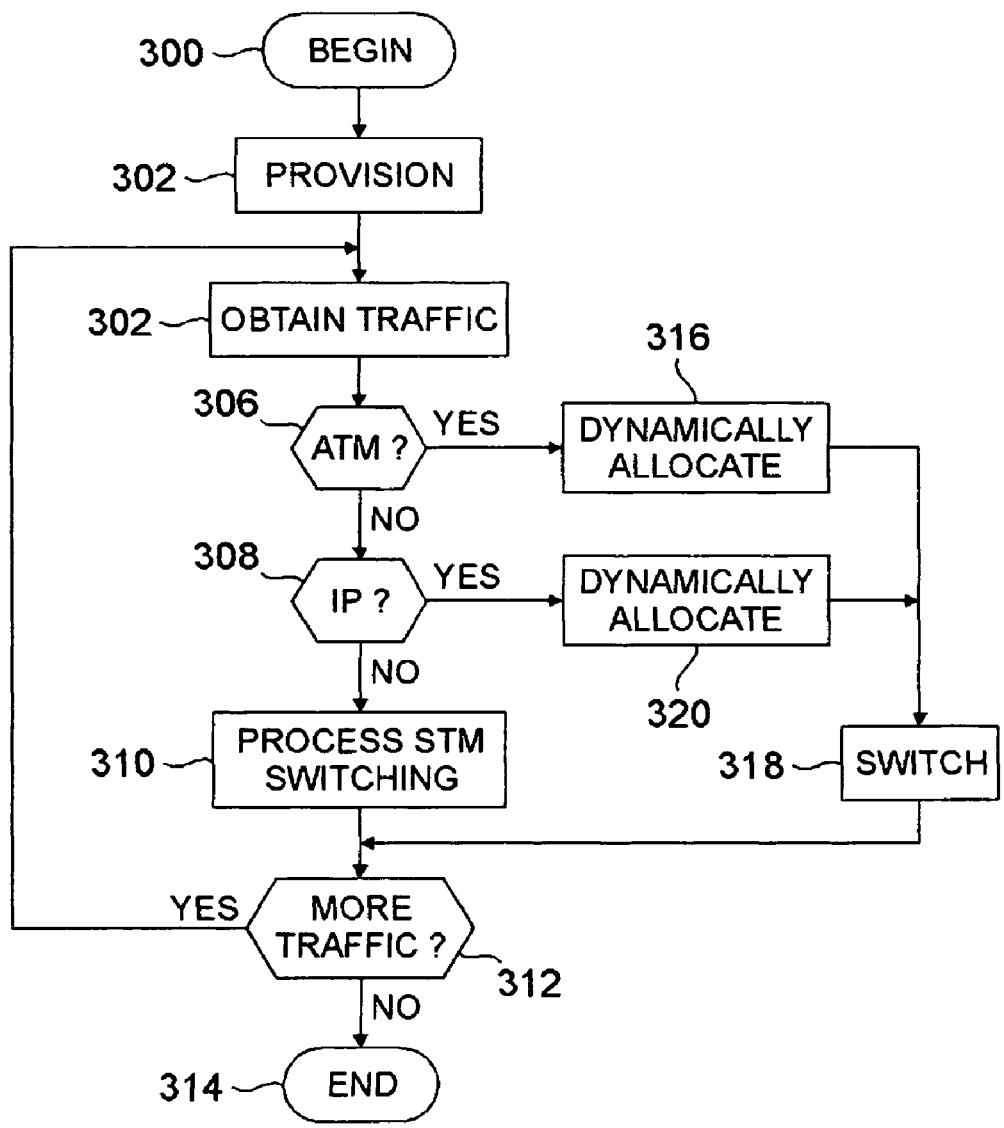
FIG. 3 is a flow chart depicting the operation of a hybrid telecommunications switch in accordance with the principles of the present invention.

The process of operating a hybrid switch in accordance with principles of the present invention is set forth in the flow chart of FIG. 3 in which the process begins in step 300 and proceeds to step 302. In step 302 the switch fabrics, for example the local STM switch fabric 242 and the central packet switch fabric 232 of FIG. 2, are provisioned. In the process of provisioning, shelf controllers, such as the shelf controller 226 of FIG. 2, are instructed that STM crossconnect entries, related to local TDMs such as TDM crossconnect 242, for example, will be set aside for traffic that is to be routed to a packet switch (which may include ATM and/or IP traffic). The remaining crossconnect entries are to be used to switch STM traffic. The STM traffic may be "real-time" traffic, such as voice or video-on-demand, for example, and the packet switched traffic may be less time-critical traffic, such as email. The STM crossconnect will also be used to switch back-hauled data traffic, that is, traffic that is at an intermediate stop on a "multi-hop" path and is better suited for delivery through an STM crossconnect than a packet switch since the traffic is merely "bypassing". Additionally, the packet switch (which may include both IP and ATM switching facilities) is configured to track the sequence of incoming ATM/IP traffic in order to recognize ATM/IP traffic (through examination of the C2 byte) routed from a local STM switch such as the switch fabric 242 of FIG. 2. In an IP switch, the provisioning entails port provisioning. In an ATM switch, a connection table and virtual path identifier/virtual channel identifier (VPI/VCI) space is provisioned.

From step 302 the process proceeds to step 304 where the local switch obtains incoming traffic from, for example, an I/O interface such as I/O interface 234 of FIG. 2. As previously described, a path overhead indicator, SONET/SDH C2 byte in the illustrative example, is used to indicate whether the payload is ATM (13 hex) or IP (cf hex) traffic. The path overhead indicator is examined and the process proceeds to step 306 where it is determined whether the payload is ATM traffic. If the traffic is not ATM traffic, the process proceeds to step 308, where, once again, the path overhead indicator is examined, this time to determine whether the traffic is IP traffic. If the traffic is not IP traffic, the process proceeds to step 310 where the traffic is switched in an STM switch fabric that employs capacity set aside for this purpose in the provisioning process of step 302. After switching the STM traffic the process proceeds to step 312 where it is determined whether more traffic is to be switched and, if so, the process returns to step 304 and proceeds from there as previously described. If no more traffic is to be switched the process proceeds to end in step 314.

Returning to step 306, if the traffic is identified as ATM the process proceeds to step 316 where time slots within the STM switch, such as the local TDM switch 242, slots that had previously been provisioned in step 302 for ATM switching, are dynamically allocated for routing the current ATM traffic to the ATM switch. The traffic is then switched within the packet switch fabric in step 318 and the process proceeds to step 312, and from there as previously described. Similarly, if, in step 308 it is determined that the traffic is IP traffic, the process proceeds to step 320 where time slots within the STM switch, slots that had previously been provisioned in step 302 for IP switching, are dynamically allocated for IP switching. The traffic is then switched within the packet switch fabric in step 318 and the process proceeds to step 312, and from there as previously described. Back hauled traffic is differentiated from IP/ATM traffic that is to be switched in the packet switch by indicating that the ATM/IP traffic to be switched in the packet switch is path-terminated.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A hybrid telecommunications switching apparatus comprising:
   one or more circuit switch fabrics;
   one or more packet switch fabrics;
   a controller configured to,
   examine traffic overhead information to determine which of said circuit switch fabrics or packet switch fabrics to route traffic to;
   dynamically allocate circuit switch resources to ATM and IP traffic to route such traffic to a packet switch fabric based on said examination, and
   to route telecommunications traffic to one or the other of the said circuit or packet switch fabrics based on said examination, wherein the overhead information comprises a SONET/SDH path, C2 overhead byte.

2. The apparatus of claim 1 wherein the circuit switch fabric is a synchronous transport signal (STS) crossconnect.

3. The apparatus of claim 1 wherein the packet switch fabric is configured to switch internet protocol (IP) or asynchronous transfer mode (ATM) traffic.

4. The apparatus of claim 1 further comprising a plurality of circuit switch fabrics.

5. The apparatus of claim 1 wherein the controller is further configured to examine the path overhead byte to determine whether the traffic is ATM, IP, or STM traffic.

6. A method of switching telecommunications traffic in a hybrid switch including a circuit switch fabric, a packet switch fabric, and a controller, the method comprising the steps of:

provisioning the circuit switch fabric for IP, ATM, and circuit switched traffic, examining a SONET/SDH path, C2 overhead byte to determine whether received traffic is IP, ATM, or circuit switched traffic, dynamically allocating circuit switch resources to ATM and IP traffic to route such traffic to a packet switch fabric based on said examination, and switching the received traffic in a packet or circuit switch fabric in response to the examination step.

7. The method of claim 6 further comprising the step of directing ATM traffic to a packet switch fabric.

8. The method of claim 6 further comprising the step of directing IP traffic to a packet switch fabric.

9. The method of claim 6 further comprising the step of directing traffic that is neither ATM or IP traffic to the circuit switch fabric.

* * * * *